United States Patent Office 2,887,851
Patented May 26, 1959

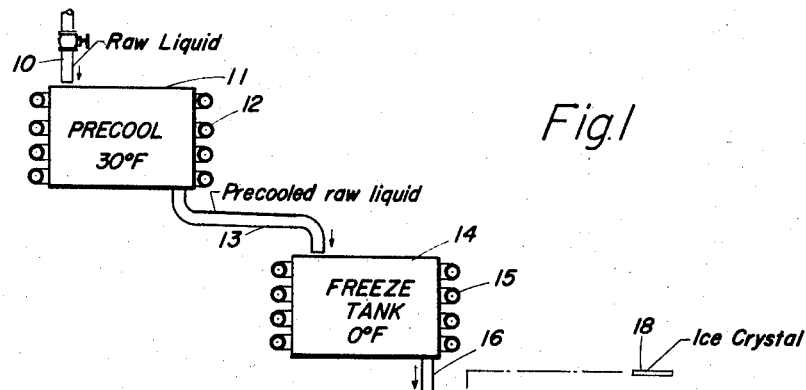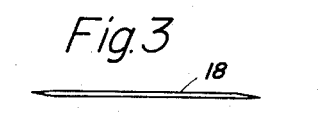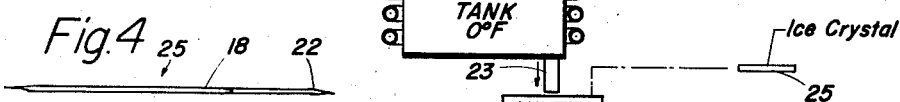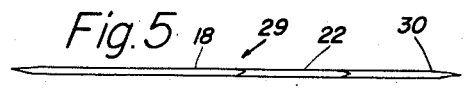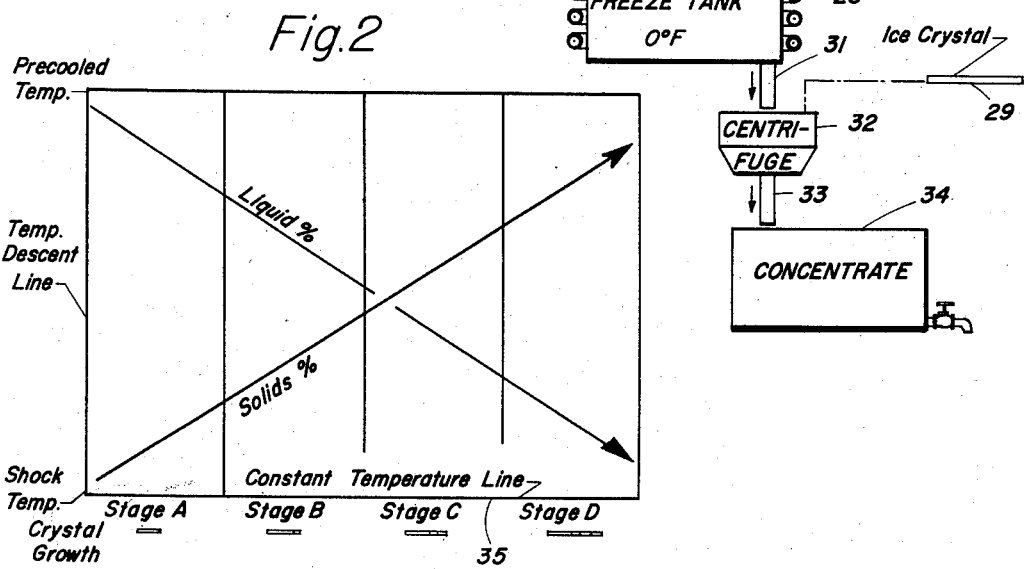

2,887,851
METHOD OF FREEZE DEHYDRATION

Harry A. Toulmin, Jr., Dayton, Ohio, assignor, by mesne assignments, to Union Carbide Corporation, New York, N.Y., a corporation of New York Application July 18, 1955, Serial No. 522,450

4 Claims. (Cl. 62—58)

The present invention relates to the concentration of liquids containing solids, more particularly, to a method of low temperature dehydration of aqueous material comprising liquids and solids, including subjecting the material to a plurality of additional freezing steps.

In low temperature dehydration processes water is removed from liquids containing solids by freezing out the water in the form of ice crystals. Various processes have been developed in an effort to devise a rapid, efficient and inexpensive method of low temperature dehydration.

Through low temperature dehydration processes citrus juices and the like are concentrated by removing a considerable quantity of the water therefrom. This, in turn, reduces the bulk of the juice and the juice concentrate is readily reconstituted by the consumer solely by the addition of water thereto. If the original fresh juice were carefully dehydrated, the reconstituted juice will contain all of the inherent flavor and taste of the juice.

Two outstanding problems are encountered when employing low temperature dehydration processes.

The first of these problems concerns the amount of time necessary to concentrate a given batch of juice. By decreasing the time of processing such a batch, greater amounts of juice may be processed in any given time interval. This, in turn, greatly enhances the economies of the operation by decreasing the expenses of processing juices.

A second problem resides in completely removing all of the water containing ice crystals formed during the freeze dehydration process. In multi-stage freezing processes most of the ice crystals are removed after each freezing step. When the final freezing step has been accomplished, all of the ice crystals formed are completely removed.

The freeze processes used in these low temperature dehydration processes usually involve progressive reduction of the temperature of the partially dehydrated juice. It has been generally found that, as the concentration of the juice increases and the amount of water therein decreases, the ice crystals formed become progressively finer. This increases the difficulty of completely centrifuging ice crystals from the dehydrated liquid since the fine ice crystals may readily pass through the perforations of the conventional centrifuge cage. Failure to remove all of the ice crystals formed increases the water content of the resultant concentrate and accordingly decreases the concentration thereof.

In the multi-stage freezing processes it is desired sometimes to retain some ice crystals after each freezing step as nucleii for the formation of crystals in the succeeding freezing step. The presence of ice crystals at the beginning of the freezing step enables crystallization to commence immediately without any delay for nucleation to occur. However, the amount of these ice crystals retained must be carefully controlled. It is increasingly difficult to control the amount of ice crystals retained within the partially dehydrated juice as the size of the ice crystals becomes progressively finer.

The present invention discloses a method of low temperature dehydration which solves both the problems of time and of completely removing ice crystals from the dehydrated liquid.

It has been found that by subjecting an aqueous liquid containing solids to a marked and abrupt drop in temperature, which I designate as "thermal shock," large needle-like ice crystals are formed. If the partially dehydrated liquid together with a portion of the ice crystals formed in a freezing step is then subjected to successive freezing steps, each of which is maintained at substantially equal temperatures, the needle-like ice crystals will become longer at each freezing stage.

The formation of progressively larger ice crystals as the process continues is the reverse of the dehydration process wherein the ice crystals grow progressively finer.

The present invention essentially comprises the steps of precooling an aqueous liquid containing solids to about 30° F. The precooled liquid is then subjected to a thermal shock of from 20 to 40° F. and exposed to this temperature for several minutes. This thermal shock to which the precooled liquid is subjected produces long needle-like ice crystals. The liquid is next exposed to successive freezing zones, each of which are maintained at substantially equal temperatures. The major portion of the ice formed in a freezing zone is removed prior to passing the juice to the next freezing zone. When the dehydrated liquid emerges from the last freezing zone, the large ice crystals are readily removed therefrom and the resultant product comprises a concentrate within which no ice crystals have been retained.

Between each freezing step the longer crystals are removed by centrifuging and crystals passing out of the centrifuge are returned to the next freeze stage to continue their elongated growth.

Successive freezing stages form ice crystals by using the elongated crystals of the preceding stage as nucleii for further growth. Consequently, the longest crystals are formed in the last freezing step. The large size ice crystals greatly facilitate the removal thereof, such as by centrifuging or the like.

It is therefore the principal object of this invention to provide a novel and improved method of low temperature dehydration of liquids containing solids.

It is another object of this invention to provide a faster and more efficient method of freeze dehydration of aqueous liquids containing solids.

It is an additional object of this invention to provide a method of low temperature dehydration of aqueous liquids containing solids wherein a maximum amount of water is removed at the time of maximum water content of the liquid.

It is a further object of this invention to provide a method of low temperature dehydration of aqueous liquids containing solids wherein the shape of the ice crystals formed is conducive to the ready separation of ice crystals from the dehydrated liquid.

It is still another object of this invention to provide a method of low temperature dehydration of aqueous liquids containing solids which includes a marked and abrupt drop in temperature for the liquid.

It is still an additional object of this invention to provide a method of low temperature dehydration of aqueous liquids containing solids wherein a precooled liquid is subjected to successive freezing zones of substantially equal temperatures.

It is still a further object of this invention to provide a method of increasing the concentration of a liquid containing solids by successively subjecting the liquid to a plurality of freezing zones of substantially equal temperatures.

Other objects and advantages of this invention will become readily apparent upon reference to the accompanying description when taken in conjunction with the following drawings, wherein:

Fig. 1 is a flow chart illustrating the coordinated steps of the method disclosed herein;

Fig. 2 is a graphic illustration of the variation of the concentration of the juice during the dehydration process;

Fig. 3 is an enlarged plan view of an ice crystal formed during the first freezing stage of this process;

Fig. 4 is a view similar to that of Fig. 3 and illustrates the ice crystals formed after the second freezing step; and Fig. 5 is a view similar to that of Figs. 3 and 4 and showing the ice crystals formed after the third freezing step.

Returning now to Fig. 1 wherein the steps of the process are illustrated, a fresh raw liquid which may be a fruit juice or the like and indicated at 10 is initially precooled at 11 to a temperature of about 30° F. Concurrently with the precooling operation, the raw liquid may be sterilized by exposing it for a period of several minutes to irradiation from ultra-violet light or the like. A suitable coolant is circulated through the coils indicated at 12 in order to gradually decrease the temperature of the liquid to approximately 30° F.

The precooled liquid as indicated at 13 is then subjected to a marked and abrupt drop in temperature of the order of from 20 to 40° F. This thermal shock may be accomplished in a freeze tank 14 which is maintained at a temperature of approximately 0° F. Suitable coolant, such as brine or the like, may be circulated through the coils 15 to maintain the temperature of the tank 14 at 0° F. The liquid is exposed to this temperature for a period.

When the liquid is initially exposed to this marked and abrupt drop in temperature, some of the water is converted into relatively long ice crystals. The rapid transfer of heat from the liquid will result in a long slender crystal growth on nucleii formed by nucleation of the water solution containing juice particles.

The resultant ice crystals will be elongated and needle-like in structure, such as is illustrated in Fig. 3. This process of freezing out water from a liquid by subjecting a liquid to a marked and abrupt drop in temperature is termed "shock freezing" or "thermal shock."

As indicated in Fig. 2, the liquid when it is admitted to the first freezing stage contains a maximum amount of water. This condition of maximum water content is conducive in the formation of large elongated ice crystals in large quantities. Consequently, maximum removal of water from the liquid occurs at that time when the liquid has its maximum water content.

During the thermal shock encountered in the freezing tank 14, the liquid may be agitated. This agitation will prevent adherence of the ice to the walls of the tank.

While the temperature of the first zone has been indicated as being 0° F., the exact temperature is immaterial as long as the temperature drop produces thermal shock.

After exposing the liquid to the freezing action of stage A, the partially dehydrated liquid together with the entrained ice crystals as indicated at 16 is flowed into a centrifuge 17.

A considerable portion of the ice crystals 18 is separated from the partially dehydrated liquid because of their length. The ice crystals remaining in the separated liquid will be used to seed the liquid in the next freezing step and will function as nucleii for the formation of ice crystals and as the basis for their own elongation by the freezing step.

The partially dehydrated liquid, together with the ice crystals retained for seeding, are conducted at 19 into the freezing tank 20 of stage B. The freezing tank 20 is similarly maintained at a temperature of 0° F. by circulating a suitable coolant through the coils indicated at 21.

During the freezing operation of stage B the liquid is agitated and water is removed in the form of elongated crystals such as illustrated in Fig. 4. The ice crystal shown in Fig. 4 comprises the crystal 18 of stage A together with the extension 22 which was formed in stage B onto the crystal 18 which served as a nucleus. Consequently, when a quantity of the water has been removed in stage B, it can be seen that the ice crystals at the conclusion of this stage are larger than the crystals formed in stage A.

Subsequently, the partially dehydrated liquid together with the entrained ice crystals is flowed at 23 to a suitable centrifuge indicated at 24.

Again, a major portion of the ice crystals formed in freezing stage B is removed as indicated at 25. The resultant partially dehydrated liquid together with the ice crystals retained for seeding or lengthening is then conducted as indicated at 26 into the freezing tank 27.

The freezing tank 27 is similarly maintained at a temperature of 0° F. by circulating a coolant through the coils indicated at 28.

After exposing the liquid to the freezing action of stage C for several minutes, ice crystals 29 such as illustrated in Fig. 5 are formed. The ice crystals 29 are formed by the freezing of an extension 30 upon the ice crystals formed in stage B. The resultant crystal as illustrated in Fig. 5 comprises the elongated crystal 18 initially formed in stage A, together with the extensions 22 and 30 formed in the successive freezing stages. Consequently, the ice crystal formed in stage C is larger than the crystals formed in the preceding freezing stages.

After exposing the liquid to the freezing action C for a period of several minutes, the partially dehydrated liquid together with the ice crystals entrained therein is drained off as indicated at 31 into a centrifuge 32. During the centrifuging operation 32, the ice crystals 29 are completely removed from the liquid. This complete removal of ice crystals is readily achieved because of the increased size of the crystals. Since the crystals are elongated they will tend to flatten against the walls of the rotating centrifugal cage and consequently will not pass through the perforations in the case. The juice separated in the centrifuging process 32 will therefore be free of any ice crystals formed throughout any of the preceding freezing stages.

The resultant concentrate is drained at 33 into a storage and mixing tank 34 for disposition as desired.

Although the liquid was subjected to three individual freezing stages, the temperatures of these freezing stages were substantially equal. It is the successive subjection of the partially dehydrated liquid to substantially equal temperatures which results in the formation of the elongated needle-like ice crystals by building upon the crystals formed in the previous freezing stage.

While a plurality of freezing tanks are indicated in Fig. 1, it is apparent that since each of the freezing stages is conducted at the same temperature the partially dehydrated juice may be recirculated through the same tank. Consequently, the utilization of this process results in economies in equipment since only a single freeze tank and centrifuge are necessary.

Fig. 2 graphically illustrates the variation of the percentages of the constituent liquids and solids of the liquid during the process. As shown in the graph the initial temperature descent line is substantially vertical indicating the marked and sudden drop in temperature to which the precooled liquid is subjected. When the liquid reaches the shock temperature, the temperature is maintained constant along the constant temperature line indicated at 35. During this time the percentage of water within the liquid steadily decreases corresponding to the increase in the amount of ice crystals which are formed as liquid passes through the freezing stages. In addition, the relative sizes of the crystals formed during the various freezing stages are also clearly illustrated.

It is noted that Fig. 2 illustrates that the liquid is subjected to four freezing stages whereas the flow chart of Fig. 1 illustrates three freezing stages. This is to indicate the number of freezing stages employed may vary and is not limited to three as illustrated in the flow chart of Fig. 1. The number of stages employed will depend largely upon the temperature at which the stages are maintained and the time during which the liquid is subjected to the freezing action of each stage. In most instances, however, the time of each freezing stage will be of the order of several minutes.

Thus it can be seen that the ice crystal formation in the low temperature dehydration process of this invention is the reverse of the conventional stage freezing process. In the process of this invention the ice crystals become progressively larger in size as the water content of the liquid decreases. In the conventional stage freezing process, the ice crystals become progressively finer corresponding to the decrease in water content. By subjecting the liquid to an abrupt and marked drop in temperature at that time when the liquid has its maximum water content, elongated needle-like ice crystals will be formed. Subsequent exposure to freezing stages of equal temperature will result in additional crystal formation upon the elongated ice crystals at their ends. Therefore, the ice crystals which will be entrained in the dehydrated liquid upon the completion of the final freezing stage will be considerably larger than would be the case if the former step-freezing process was employed. The large size of the ice crystals greatly facilitates centrifuging of the dehydrated liquid from the crystals.

In addition, the total time required to dehydrate a batch of fresh liquid employing the method of this invention is greatly reduced with respect to the prior process. In the prior process it is necessary to subject the juice to the freezing action of each stage for a period of the order of 20 minutes. In the process of this invention, however, the liquid is exposed to the freezing action of each freezing stage for a period of the order of a few minutes at most.

Thus, the problem of completely removing the ice crystals formed in low temperature dehydration processes is eliminated due to the presence of large size ice crystals. Furthermore, the process of this invention represents greater efficiency over low-temperature dehydration processes due to the substantial reduction in the time necessary for the dehydration of a batch of liquid.

I have found that thermal shock causes the formation of long ice crystals and continuation of the same temperature, either in the same tank or successive tanks, will cause the crystals to elongate the longer they are subjected to the thermal shock temperature.

It will be understood that this invention is susceptible to modification in order to adapt it to different usages and conditions, and, accordingly, it is desired to comprehend such modifications within this invention as may fall within the scope of the appended claims. It will be understood the temperatures are illustrative and relative as the exact temperatures depend upon the nature of the material being dehydrated. The number of stages from one to several depends upon the result desired.

What is claimed is:

1. In a method of dehydrating aqueous heat-sensitive materials bearing solids and growing ice crystals therein that are progressively elongated, the steps of reducing the temperature of the heat-sensitive material sharply 20 to 40° F. to a temperature of about 0° F. to form elongated ice crystals due to the sudden drop of temperature whereby the aqueous material is partially concentrated, removing a portion of the ice crystals from the partially concentrated aqueous material, applying the same temperature of about 0° F. to the partially concentrated aqueous material and entrained ice crystals to progressively elongate the ice crystals formed in the preceding step whereby as the amount of water decreases, the solids increase and the length of the crystals increases to facilitate the centrifuging of the crystals from the concentrated aqueous material.

2. In a method of dehydrating aqueous heat-sensitive materials bearing solids and growing ice crystals therein that are progressively elongated, the steps of pre-cooling the aqueous material to a temperature of about 30° F., sharply reducing the temperature of the heat-sensitive material to a temperature of about 0° F. to form elongated ice crystals due to the sudden drop of temperature whereby the aqueous material is partially concentrated, removing a portion of the ice crystals from the partially concentrated aqueous material, applying the same temperature of about 0° F. to the partially concentrated aqueous material and entrained ice crystals to progressively elongate the ice crystals formed in the preceding step whereby as the amount of water decreases, the solids increase and the length of the crystals increases to facilitate the centrifuging of the crystals from the concentrated aqueous material.

3. In a method of dehydrating aqueous heat-sensitive materials bearing solids and growing ice crystals therein that are progressively elongated, the steps of sharply reducing the temperature of the heat-sensitive material to a temperature of about 0° F. to form elongated ice crystals due to the sudden drop of temperature whereby the aqueous material is partially concentrated, removing a portion of the ice crystals from the partially concentrated aqueous material, applying the same temperature of about 0° F. to the partially concentrated aqueous material and entrained ice crystals to progressively elongate the ice crystals formed in the preceding step whereby as the amount of water decreases, the solids increase and the length of the crystals increases to facilitate the centrifuging of the crystals from the concentrated aqueous material.

4. In a method of dehydrating aqueous heat-sensitive materials bearing solids and growing ice crystals therein that are progressively elongated, the steps of pre-cooling the aqueous material to a temperature of about 30° F., markedly and abruptly reducing the temperature of the heat-sensitive material 20 to 40° F. to a temperature below the freezing point of the aqueous material to form elongated ice crystals due to the sudden drop in temperature whereby the aqueous material is partially concentrated, removing a portion of the ice crystals from the partially concentrated aqueous material, applying the same said temperature of below the freezing point of the aqueous material to the partially concentrated aqueous material and entrained ice crystals to progressively elongate the ice crystals formed in the preceding step whereby as the amount of water decreases, the solids increase and the length of the crystals increases to facilitate the centrifuging of the crystals from the concentrated aqueous material.

References Cited in the file of this patent

UNITED STATES PATENTS

| | | |
|---|---|---|
| 1,636,890 | Zorn | July 26, 1927 |
| 2,389,732 | Kellogg | Nov. 27, 1945 |
| 2,436,218 | Malcolm | Feb. 17, 1948 |
| 2,552,523 | Cunningham | May 15, 1951 |
| 2,552,524 | Cunningham | May 15, 1951 |
| 2,559,204 | Wenzelberger | July 3, 1951 |
| 2,657,551 | Toulmin | Nov. 3, 1953 |